United States Patent [19]
Fairbanks, Sr. et al.

[11] Patent Number: 5,790,653
[45] Date of Patent: Aug. 4, 1998

[54] LINE-POWERED DETECTION OF CALL PROGRESS TONES

[75] Inventors: John P. Fairbanks, Sr.; Scott M. Fairbanks, both of Sunnyvale, Calif.

[73] Assignee: VoiceWaves, Inc., Sunnyvale, Calif.

[21] Appl. No.: 784,454

[22] Filed: Jan. 16, 1997

Related U.S. Application Data

[63] Continuation of Ser. No. 369,378, Jan. 6, 1995, abandoned.

[51] Int. Cl.$^6$ .................................................. H04M 19/00
[52] U.S. Cl. ........................... 379/372; 379/377; 379/382; 379/413
[58] Field of Search ........................... 379/372, 413, 379/396, 373, 89, 252, 376, 386, 351, 374, 375, 382, 350, 29, 27, 184

[56] References Cited

U.S. PATENT DOCUMENTS

| | | | |
|---|---|---|---|
| 4,086,434 | 4/1978 | Bocchi | 379/84 |
| 4,221,933 | 9/1980 | Cornell | 379/84 |
| 4,277,649 | 7/1981 | Sheinbein | 379/246 |
| 4,289,931 | 9/1981 | Baker | 379/247 |
| 4,395,590 | 7/1983 | Pierce et al. | 379/387 |
| 4,534,041 | 8/1985 | Münter | 375/94 |
| 4,696,031 | 9/1987 | Freudberg | 379/386 |
| 4,737,984 | 4/1988 | Brown | 379/372 |
| 4,748,664 | 5/1988 | Blomley | 379/395 |
| 4,782,518 | 11/1988 | Mattley et al. | 379/201 |
| 4,803,719 | 2/1989 | Ulrich | 379/413 |
| 4,809,272 | 2/1989 | Torgrim et al. | 370/110.3 |
| 4,809,321 | 2/1989 | Morganstein et al. | 379/211 |
| 4,821,314 | 4/1989 | Guyader et al. | 379/376 |
| 4,852,151 | 7/1989 | Dittakavi et al. | 379/97 |
| 4,878,236 | 10/1989 | Ray et al. | 379/37 |
| 4,893,332 | 1/1990 | Brown | 379/97 |
| 4,935,958 | 6/1990 | Morganstein et al. | 379/372 |
| 4,961,220 | 10/1990 | Tentler et al. | 379/413 |
| 4,995,076 | 2/1991 | Joffe et al. | 379/257 |
| 5,007,000 | 4/1991 | Baldi | 365/513.5 |
| 5,063,593 | 11/1991 | Kwon | 379/386 |
| 5,327,493 | 7/1994 | Richmond et al. | 379/372 |
| 5,369,518 | 11/1994 | Aslami et al. | 379/379 |
| 5,422,939 | 6/1995 | Kramer et al. | 379/377 |

OTHER PUBLICATIONS

Chandler, Maryann, Editor; "US WEST To Offer Message Waiting Indication—Visual"; US WEST On A Newsletter Jan. 1991, pp. 2–6; Seattle, WA.

*Primary Examiner*—Krista Zele
*Assistant Examiner*—Jacques M. Saint-Surin
*Attorney, Agent, or Firm*—Fish & Richardson P.C.

[57] ABSTRACT

The invention provides a method for detecting a call progress tone on a pair of telephone conductors (the telephone line). The level of energy stored in an energy storage device is continually checked. When the level of energy of the energy storage device is below a threshold, the system couples the telephone line to an off-hook impedance. While coupled to the telephone line, the system charges the energy storage device using current drawn from the telephone line, and the system detects the presence of the call progress tone on the telephone line.

20 Claims, 8 Drawing Sheets

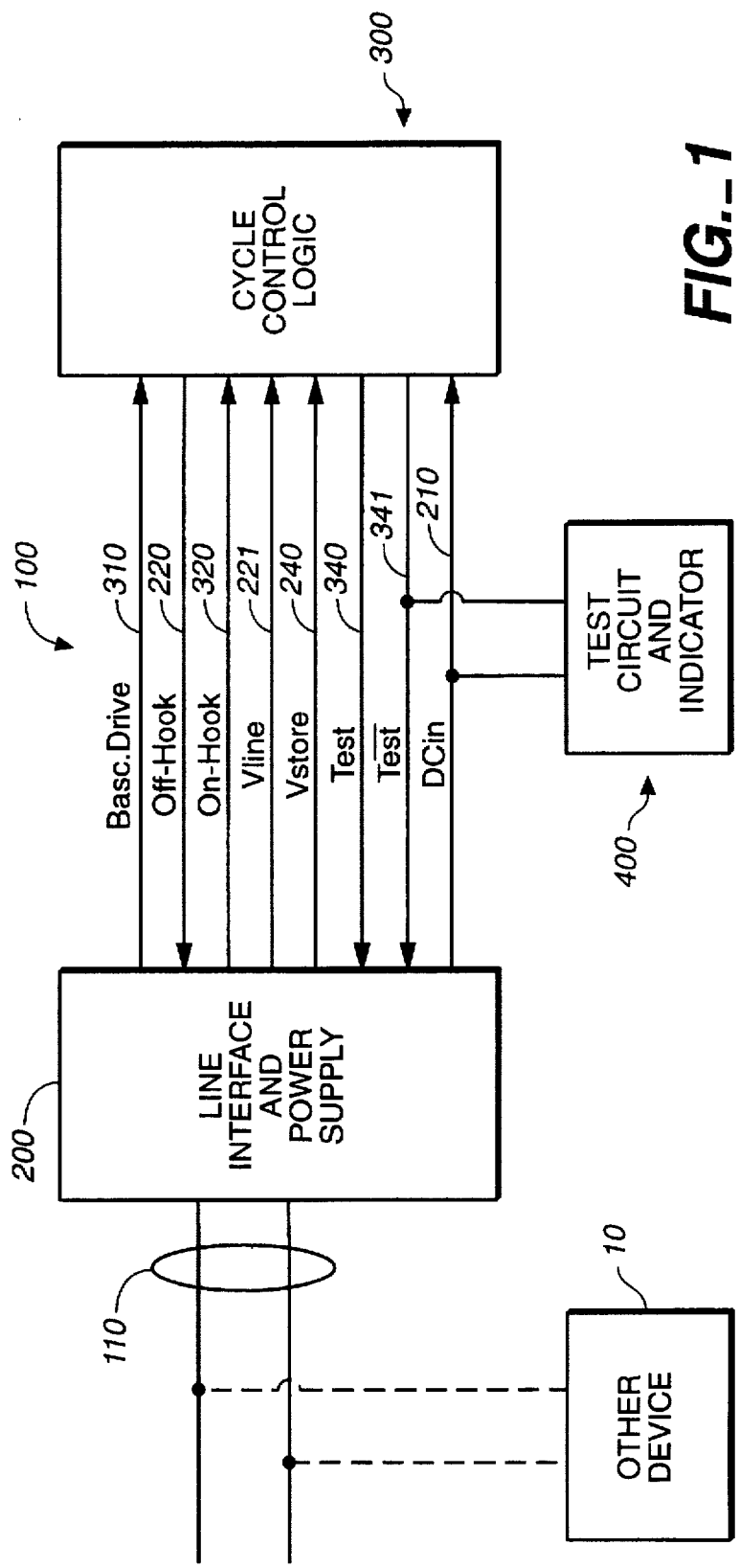
FIG._1

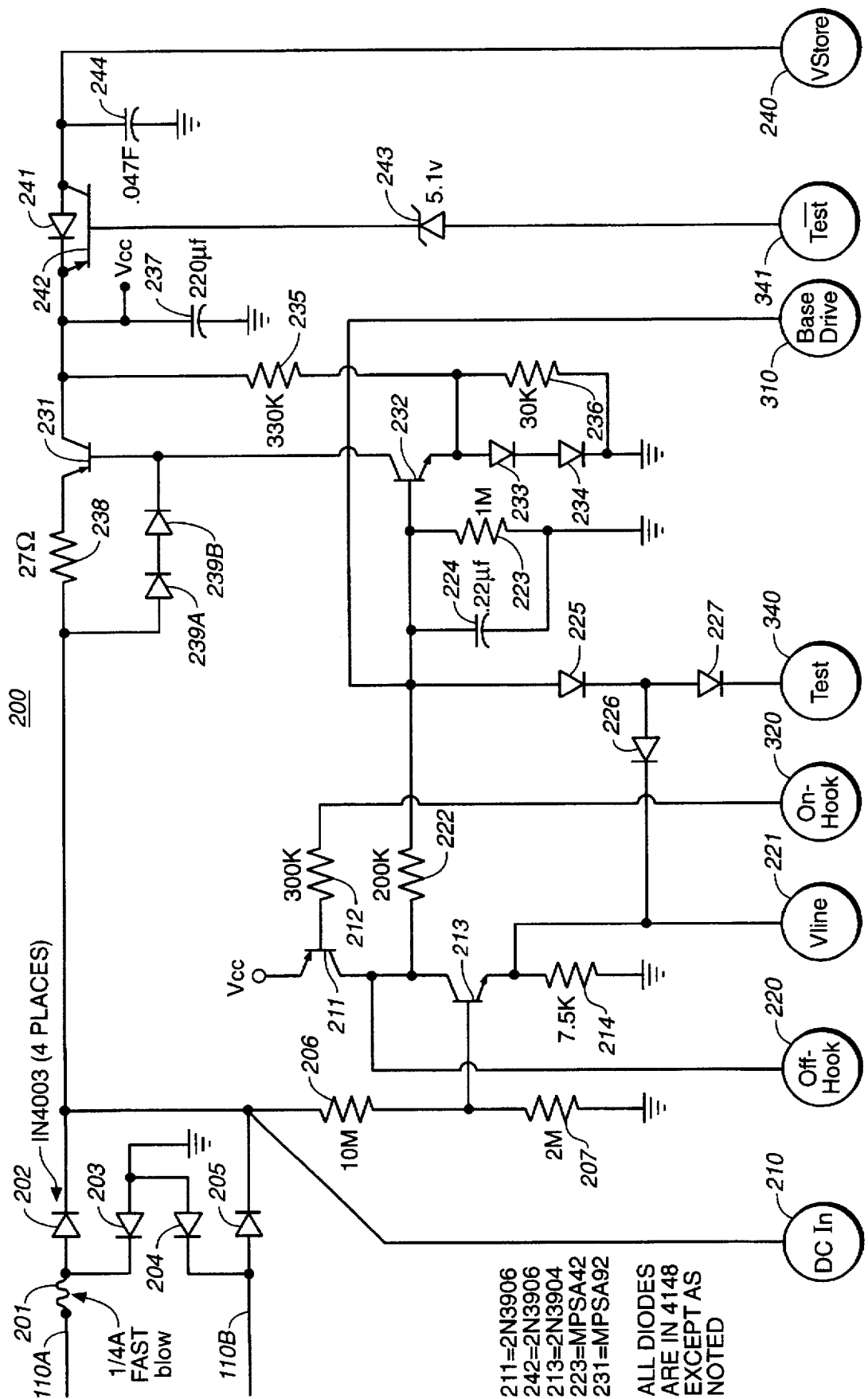
FIG._2  LINE INTERFACE AND POWER SUPPLY

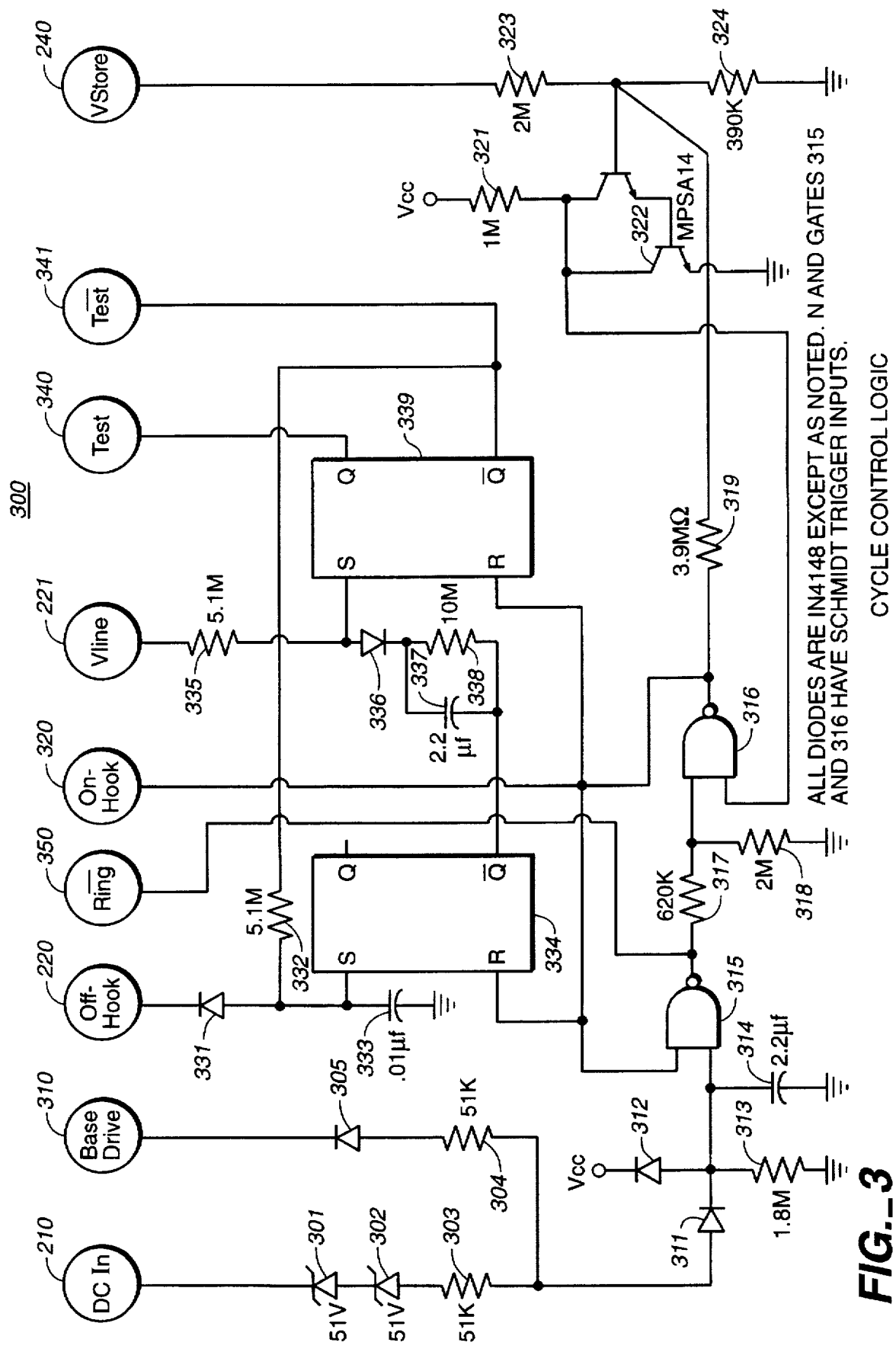
FIG._3

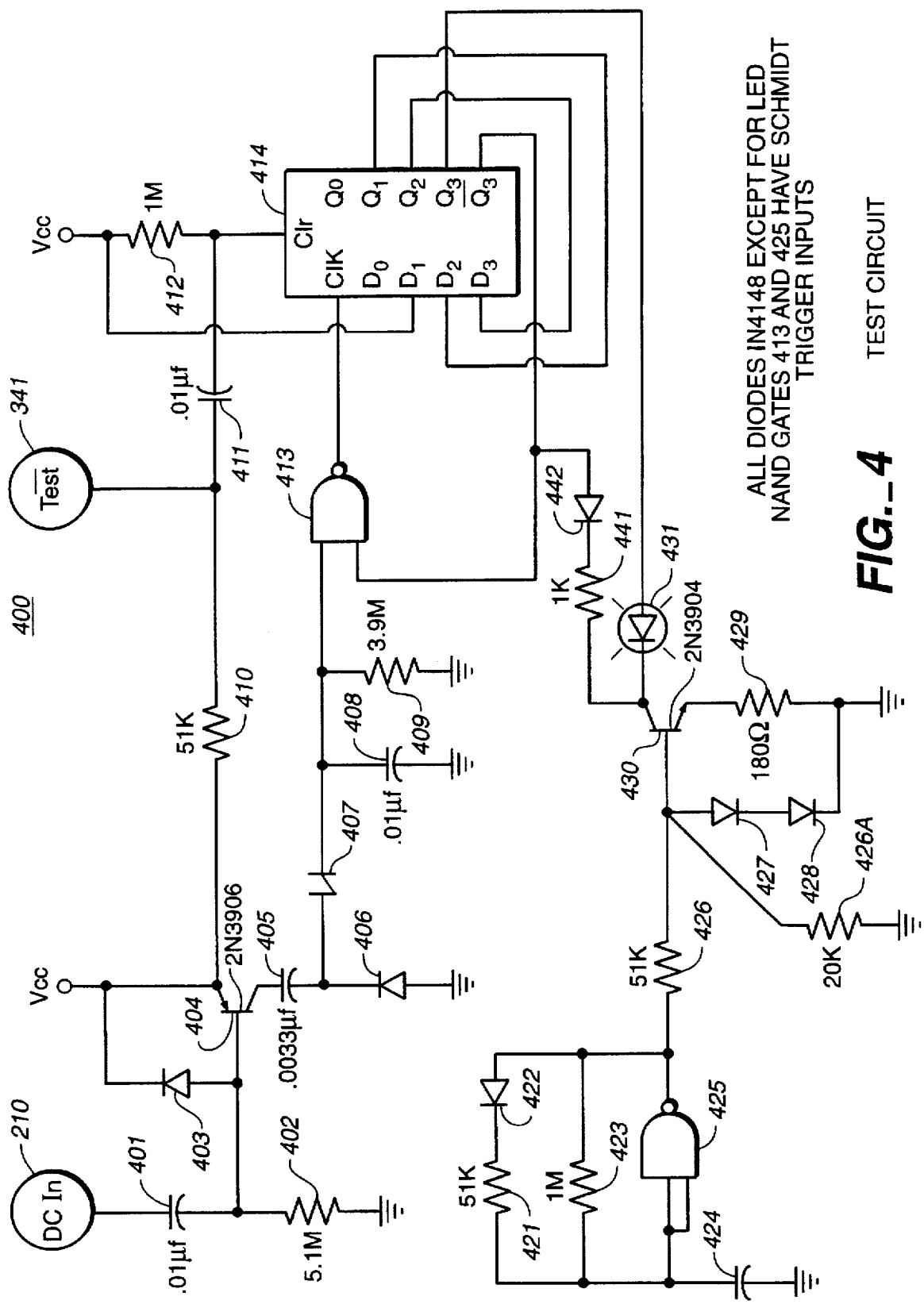
FIG._4    TEST CIRCUIT

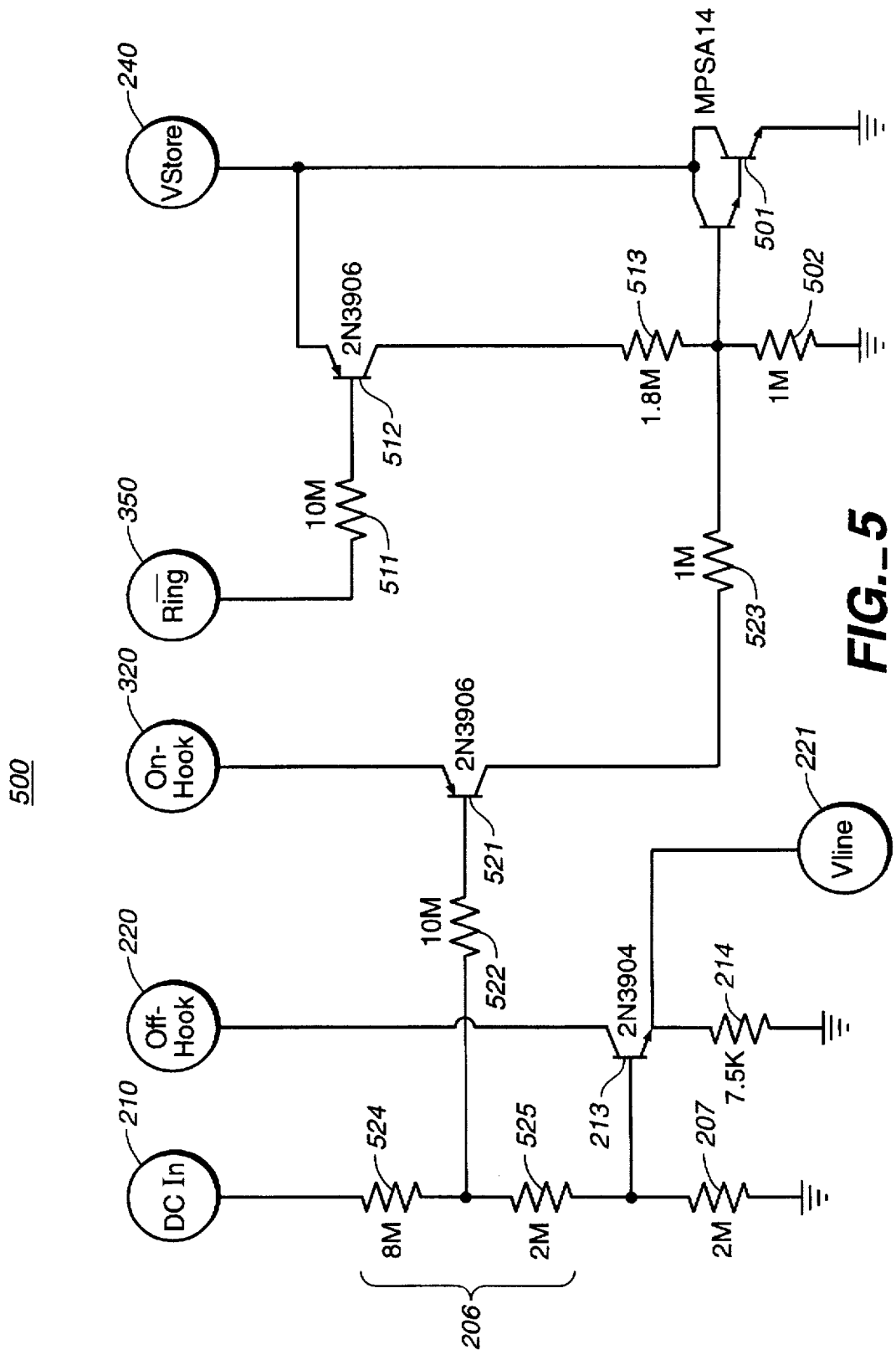
FIG._5

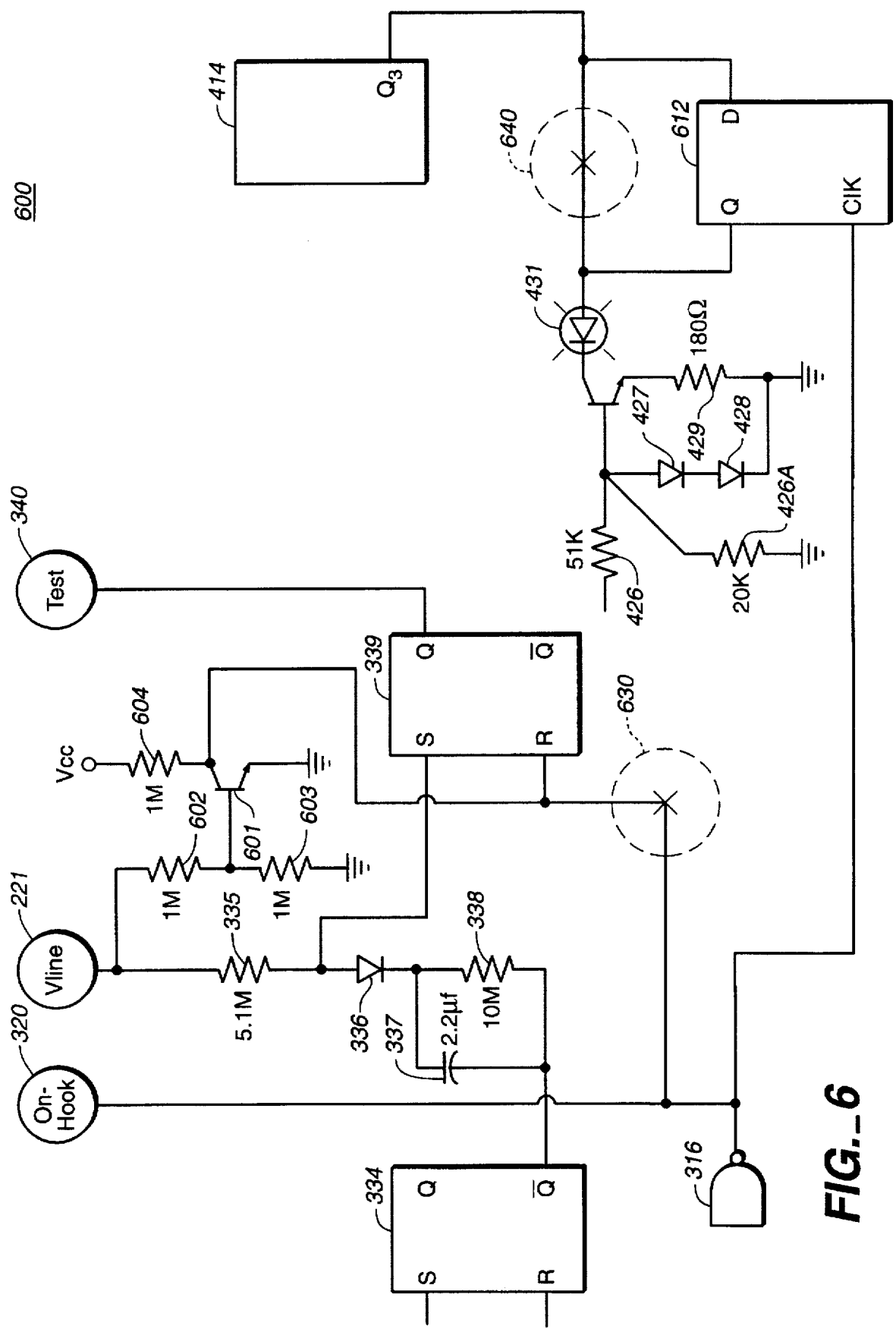
FIG._6

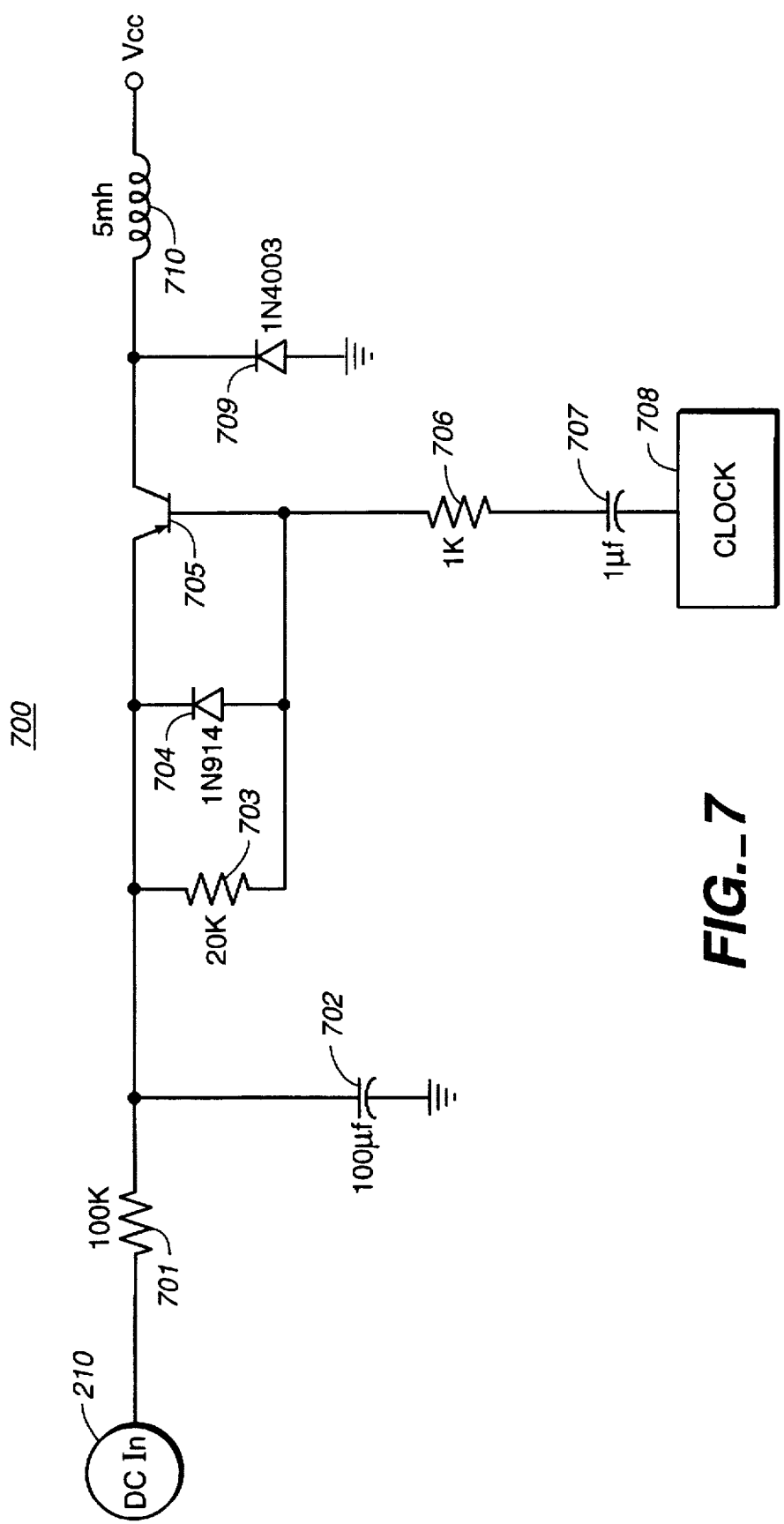
FIG._7

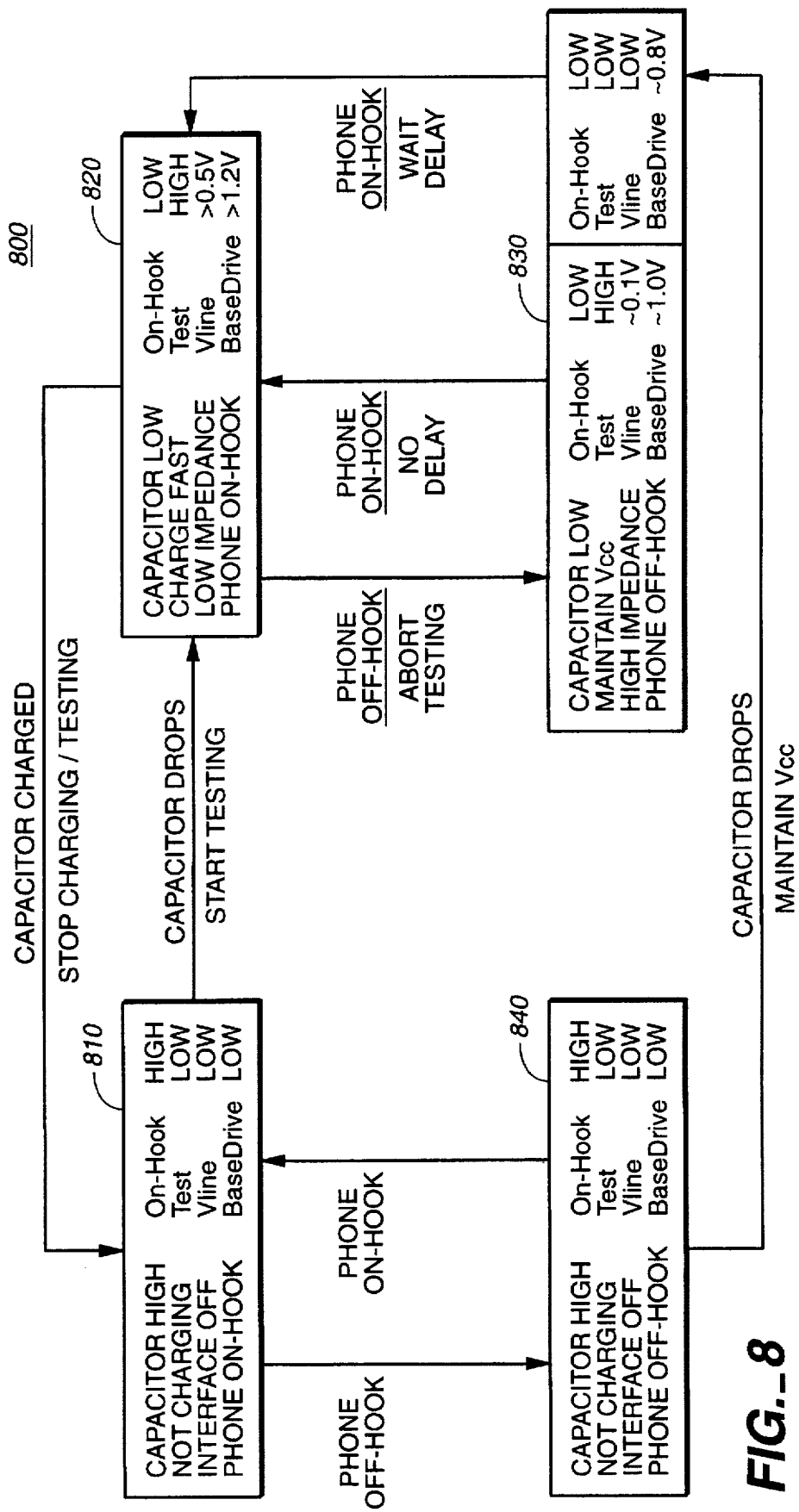
FIG._8

1

LINE-POWERED DETECTION OF CALL PROGRESS TONES

This is a continuation of application Ser. No. 08/369,378, filed Jan. 6, 1995, now abandoned.

BACKGROUND

This invention relates to the detection of call progress tones on telephone lines and specifically to "stuttered dial tones."

Call progress tones, such as busy tones or stuttered dial tones, are used to signal a variety of events over telephone lines. A central telephone switching office or private branch exchange (PBX) can generate these tones at little cost. In many voice mail systems, users can find out if they have messages waiting by hearing the stuttered dial tone instead of the usual dial tone or more complex visual displays.

Voice mail systems that provide only a stuttered dial tone signal for waiting messages can displease users, since the systems lack a visual indicator. It takes time to repeatedly check the telephone system for waiting messages, and users often neglect to do so. In business environments, failing to check and retrieve messages can result in angry customers and lost business.

The need for a visual indication in voice mail systems is widely recognized. Most home answering machines have such indicators. Although the Federal Communications Commission presently prohibits the use of automatic devices that go "off-hook" (in effect, picking up the hand set) to detect stuttered dial tones on public telephone networks, there is no prohibition to such devices on PBXs. Several products have been introduced to provide automatic visual message signaling. In addition, U.S. Pat. No. 5,327,493, issued to Richmond et al., describes a method and apparatus for checking telephone lines for call progress tones, such as a stuttered dial tone, and visually indicating that messages are waiting.

SUMMARY

In general, in one aspect, the invention provides a method for detecting a call progress tone on a pair of telephone conductors (the telephone line). The level of energy stored in an energy storage device is continually checked. When the level of energy of the energy storage device is below a threshold, the system couples the telephone line to an off-hook impedance. While coupled to the telephone line, the system charges the energy storage device using current drawn from the telephone line, and the system detects the presence of the call progress tone on the telephone line.

In general, in another aspect, the invention provides apparatus for detecting a call progress tone on the telephone line. A line interface and power supply connects to the telephone line, storing energy obtained from it. A cycle control logic block determines when the line interface presents a low off-hook impedance to the telephone line, based upon the level of energy stored by the power supply. When the system presents a low off-hook impedance, the power supply recharges the energy storage device from current drawn from the telephone line, while a test circuit and indicator block detects and indicates the presence of the call progress tone on the telephone line.

Implementations of the invention may include the following features. The energy storage device can be a capacitor. The call progress tone can be detected by first amplifying the tone with a transistor, bandpass filtering the tone, converting the tone to pulses and then counting the pulses. The system can interrupt the detection of call progress tones and the charging of the energy storage device if another device (for example, a telephone or modem) begins use of the telephone line, and then restart the detection and charging cycle when such other use ends. The system can purposely drain the energy storage device after a ringing signal on the telephone line, and after telephone use, so that the detection and charging cycle begins shortly after both completed and uncompleted calls on the telephone line.

The invention provides a dual-mode current source employing transistors that always run active. In the low current mode, the unit provides a high input impedance that eliminates interference with modems and other line devices. The low current mode appears as a current source to telephone lines and as a voltage source to internal circuitry of the invention, keeping the invention operational without degrading voice quality or interfering with modem use. In a high current mode, when the unit switches off-hook to test for call progress tones, the unit provides a high AC impedance. This keeps a high signal level, so that call progress tones can be detected by a single biased transistor rather than an operational amplifier.

Among its advantages, the system of the present invention achieves low power consumption by employing an asynchronous, event driven system rather than a clocked or timed system. The invention is fail-safe in that it senses its remaining energy level and switches off-hook to draw energy and detect call progress tones. The invention initially draws current from line ringing voltage, after the invention is first connected to the telephone line, to power up the invention. Moreover, the invention has no free-running clocks for timing system operation to draw power.

The invention can be used to line-power any static load devices, so that the static load device draws supply current from the telephone line only when the static load presents an off-hook impedance to the line. The invention also provides for drawing current from the telephone line, while isolating internal AC frequencies.

Other advantages and features of the invention will become apparent from the following description and from the claims.

BRIEF DESCRIPTION OF THE DRAWINGS

FIG. 1 is a system block diagram of a line-powered call progress tone detector.

FIG. 2 is a circuit diagram of a line interface and power supply block.

FIG. 3 is a circuit diagram of a cycle control logic block.

FIG. 4 is a circuit diagram of a test circuit and indicator block.

FIG. 5 is a circuit diagram of a modification to the line interface and power supply block.

FIG. 6 is a circuit diagram of a modification to cycle control logic and test circuit and indicator blocks.

FIG. 7 is a circuit diagram of a modification to the line interface and power supply block.

FIG. 8 is a state diagram for the operation of the line-powered call progress tone detector.

DESCRIPTION

Referring to FIG. 1, a line-driven call progress tone detection system 100 has a line interface and power supply block 200 to retrieve, store and generate the required voltages from a telephone line 110, a cycle control logic block 300 that generates the test and power supply operating modes based on sampled conditions of the telephone line and the power supply, and a test circuit and indicator block 400 for performing stuttered dial tone detection and providing an indicator if a message is waiting. Telephone line 110 can be shared by one or more other devices 10, such as a telephone or modem. System 100 changes test cycle and operating modes based upon the conditions of the telephone line and the power supply to insure fail-safe line powering.

The line interface and power supply block 200 draws telephone line current when system 100 goes off-hook. The drawn current allows energy to be stored in a storage capacitor and provides the necessary signal for detecting a stuttered dial tone. The line interface and power supply block 200 also samples the line voltage level to determine if the telephone line is in use and draws a very low current during such use while monitoring the line to determine when this use has ended.

Referring to FIG. 2, fuse 201, across one of the two telephone input wires 110A or 110B, is required to meet FCC Part 68 requirements and is intended to blow when a high current, high voltage signal is applied (such as a bolt of lightning). Rectifier diodes 202, 203, 204, and 205 allow tip and ring conductors to be interchanged without hurting the system. Resistors 206 and 207 form a voltage divider to feed the base of transistor 213. Transistor 211 is turned on through resistor 212 when On-Hook signal 320 goes low. Assuming the system is already operating and the logic supply voltage $V_{cc}$ is present (discussed below, in reference to the cycle control logic block 300), transistor 213 and resistor 214 follow the divided down input voltage when transistor 213 is biased by turning on transistor 211. A fraction of the input voltage from telephone line 110 appears across resistor 214 when transistor 211 is on, resulting in control signal Vline 221.

Control signal Vline 221 indicates that telephone line 110 is not in use by another device. If Vline 221 is high (approaching $V_{cc}$), the tip and ring voltages are near an open circuit level (42–56 volts). If another device uses the telephone line, the DC In signal 210 voltage drops to around 6 volts and Vline 221 will be about 0.2 volts. Vline 221 being low prevents the start of the high current test and charging cycle (explained in relation to FIG. 3 below). If a test cycle has already begun and some device 10 begins use of telephone line 110, Vline 221 pulls low and stops the high current test and charging cycle mode, which would otherwise tend to erode voice quality. Vline 221 is therefore only generated when the system is off-hook for any reason. When transistor 211 is on, it also biases the base of transistor 232 through resistor 222. Resistor 223 is a pull down that insures transistor 232 turns completely off when the bias is removed.

Capacitor 224 filters out voltage changes at the base of transistor 232 due to its collector base capacitance and keeps the AC impedance high. When transistor 232 turns on, it provides a base drive to transistor 231. This allows capacitor 237 on the supply voltage $V_{cc}$ to charge, storing energy from telephone line 110.

Transistors 231 and 232 turn on when On-Hook signal 320 goes low. This occurs, as described below, when the cycle control logic block 300 takes system 100 off-hook. If system 100 is off-hook and Test signal 340 is low (indicating that the system is not currently testing for a stuttered dial tone but the telephone line is in use), the base of transistor 232 is clamped at two diode drops through diodes 225 and 227. This results in a voltage drop of approximately one diode drop across resistor 236. Negative feedback is achieved by means of the current through resistor 235 to help stabilize the voltage across capacitor 237. While Test signal 340 is low, transistors 231 and 232 and the support circuitry connected to them function as a feedback-controlled constant voltage source. Transistors 231 and 232 are held in an active rather than saturated state all the time. Since the voltage feedback of system 100 is from the internal power supply, rather than telephone line 110, transistors 231 and 232 appear as a current source to telephone line 110. This presents a very high AC impedance to telephone line 110, preventing interference with modems or similar equipment.

When Test signal 340 goes high and Vline signal 221 goes low, this indicates that another device (e.g., a telephone) has begun using telephone line 110, while system 100 is attempting to test it. If this happens, a constant voltage, low current mode of operation is maintained. The low current mode prevents poor voice quality while the line is being used for voice communication, but still draws enough current from the line to maintain supply voltage $V_{cc}$, keeping the system operating. To allow this to happen, resistor 214 must be much lower in value than resistor 222. At the same time, system 100 continues to draw power off telephone line 110 to maintain $V_{cc}$ and prevent power failure. While doing so, as explained above, the system maintains the input impedance high enough so that it does not interfere with proper operation of modems or fax machines sharing the telephone line.

When Vline 221 is high and Test 340 is high, a high current off-hook mode is enabled. During this high current off-hook mode (that is, when the system connects telephone line 110 to an off-hook impedance to test for call progress tones), the storage capacitor 244 is recharged and the stuttered dial tone recognition test is performed. When Test 340 goes high, Inverse Test 341 goes low. This breaks down zener diode 243 and turns on transistor 242 to charge capacitor 244. The base drive of transistor 232 is sufficient to overdrive the feedback, forward-bias diodes 233 and 234 and cause the voltage on capacitor 237 to exceed its low current mode regulation limit. The input current from telephone line 110 is limited by the current clamp on transistor 231 formed by resistor 238 and diodes 239A and 239B. Typically, and depending upon telephone line voltage, the current will be limited to about 25 milliamps, and supply voltage $V_{cc}$ (the voltage supplied by capacitor 244 and regulated by capacitor 237) will be limited by the zener voltage of zener diode 243 and the $V_{BE}$ of transistor 242 while capacitor 244 charges. The voltage on capacitor 244 is one of the inputs to the cycle control logic block 300 which terminates the charging and test cycle, once capacitor 244 has charged, and returns system 100 back to its on-hook mode. While on-hook, $V_{cc}$ is powered from capacitor 244 through diode 241, no testing of telephone line 110 is performed, and an on-hook impedance is presented to telephone line 110.

Charging capacitor 244 through a current source allows system 100 to present a DC impedance of a few hundred ohms while maintaining an AC impedance of thousands of ohms. Such an AC impedance presents a dial tone signal of at least one volt peak-to-peak, allowing test circuit 400 to use a single transistor amplifier rather than an operational amplifier circuit for signal detection. Component tolerances can be loosened as well, due to the available signal strength.

When system 100 is initially connected by a user to telephone line 110, cycle control logic block 300 automatically powers system 100 from the ring voltage available on telephone line 110. Cycle control logic block 300 prevents system 100 from running out of power by sensing the voltage on Vstore line 240 and going through a charge and test cycle when that voltage gets too low. Cycle control logic block 300 also makes sure telephone line 110 is not in use before it re-initiates a charge and test cycle, preventing interference with voice communications.

When system 100 is off-hook and telephone line 110 then goes off-hook, the cycle control logic block 300 waits a period of time (described in detail below) after the line is no longer in use to initiate the charge and test cycle. This insures that PBX software has time to update stuttered dial tone status after the telephone has been hung up.

Referring to FIG. 3, when telephone line 110 rings (i.e., from signals sent from the PBX), the voltage of DC In 210 will rise to over 170 volts under no load conditions. Zener diodes 301 and 302 break down under this condition and conduct through resistor 303 and diode 311 to charge capacitor 314. The logic supply voltage $V_{cc}$ is provided through diode 312 one diode drop below the voltage on capacitor 314. After capacitor 314 develops a charge, the resulting voltage causes current to be conducted through resistor 304 and diode 305 to BaseDrive 310. This causes the current source of the power supply block 200 (transistors 231 and 232) to turn on, providing another path to logic supply voltage $V_{cc}$. The net result is that logic supply voltage $V_{cc}$ is charged primarily from the ringing voltage, and not capacitor 244, while the phone is ringing. This is also how system 100 obtains its initial power when first connected to telephone line 110.

The voltage on capacitor 314 presents a logic 1 level to the input of NAND gate 315 for some time after the ring signal has stopped. This time is determined by resistor 313 and capacitor 314. The other input to gate 315 is On-Hook signal 320. Since system 100 is on-hook when telephone line 110 starts ringing, On-Hook signal 320 is high and the output of gate 315 goes low until capacitor 314 discharges sufficiently to present a logic low level to gate 315. The values of resistor 313 and capacitor 314 are chosen so that the minimum on-hook time after ringing exceeds the time between rings, preventing system 100 from going off-hook while the telephone is ringing. The value of capacitor 237 is chosen so that the decay of $V_{cc}$ is much slower than this minimum on-hook time.

When the telephone is not ringing, the start of the charge and test cycle is initiated when system 100 needs the power supply charged up. This is determined by sampling Vstore voltage 240 through resistor divider 323 and 324 and feedback resistor 319. The feedback resistor 319 allows the transistor to switch on and off at different voltages. This hysteresis determines the period of each charge and test cycle. When Vstore 240 is no longer sufficient to bias transistor 322 it turns off, presenting a logic 1 to the input of NAND gate 316. (Note that transistor 322 is a Darlington pair that keeps current low and on-off transitions sharp.) Since telephone line 110 is not ringing, Inverse Ring 350 is also a logical 1, forcing the output of NAND gate 316 low. Resistors 317 and 318 insure that gate 316 powers up in the correct state. The output of NAND gate 316 then goes low, initiating a charge and test cycle, with a low On-Hook signal 320. Otherwise, during the time that system 100 is on-hook, latches 334 and 339 are constantly reset with a high On-Hook signal 320. When system 100 goes off-hook and telephone line 110 is not in use, Vline 221 goes high, setting latch 339 and initiating a test and charge cycle. However, if the telephone line 110 is in use, Vline 221 does not go high and latch 339 does not get set. This allows capacitor 333 to charge from the inverse Q output of latch 339 through resistor 332. During on-hook conditions, this cannot happen since diode 331 will clamp capacitor 333 to one diode drop above ground through diode 331. When capacitor 333 charges up, it sets latch 334, making its inverse Q output go low, forcing a time delay to occur between when Vline 221 goes high again and when latch 339 is set. The delay is a function of the RC time constant of resistor 335 and capacitor 337. Diode 336 completes the current path when inverse Q of latch 334 is low and resistor 338 discharges capacitor 337 while system 100 is on-hook. This results in a hang-up delay after telephone line 110 is in use before system 100 goes through another charge and test cycle.

Referring to FIG. 4, the AC input signal from telephone line 110 is coupled from line DC In 210 through capacitor 401. Resistor 402 keeps transistor 404 biased slightly on, such that incoming AC signal will cause a rail-to-rail AC output on the collector of transistor 404. Prior to Inverse Test signal 340 pulling low, the collector of transistor 404 is high. The AC output only appears at the collector of transistor 404 when Inverse Test 341 is low, indicating that a test cycle is in progress. In addition to enabling the amplifier formed by transistor 404, Inverse Test 341 resets counter 414 through capacitor 411 and resistor 412 by pulling low. The incoming AC telephone signal couples to counter 414 through capacitor 405. During the positive half cycle, current is conducted through diode 407. During the negative half cycle, capacitor 405 discharges through resistor 410 and diode 406. If the incoming AC signal has too high a frequency, capacitor 405 cannot discharge in time, limiting the charge coupled through diode 407 during the next positive half cycle, accomplishing a low pass filtering of the AC signal. If the pulses are not coupled at a high enough frequency, capacitor 408 will not charge faster than resistor 409 discharges it, accomplishing a high pass filtering of the AC signal. The bandpass frequency range is chosen to accept the low-frequency beeps of call progress tones, and reject all other signals and noise. The filtered signal appears on capacitor 408 at the input of NAND gate 413.

When telephone line 110 provides a proper frequency AC signal (e.g., a stuttered dial tone), a square wave is produced at the output of Schmidt trigger NAND gate inverter 413. The output square wave causes counter 414 to count to three, at which point the inverse Q3 output from counter 414 stops NAND gate 413 from counting any more, locking the counter at that value. Counter 414 and gate 413 can be arranged to count to different numbers, depending on the nature of call progress tone to be detected. The Q3 output from 414 drives one end of LED 431. The other end is driven by transistor 430. Resistor 426, 426A and 429 and diodes 427 and 428 form a current source with transistor 430 to limit the maximum current. Resistor 426A shifts the V-I characteristics of the current source of transistor 430 to limit the current as supply voltage $V_{cc}$ becomes low, allowing system 100 to start properly as described above, rather than allowing $V_{cc}$ to drop lower than required by the logic devices. Resistors 421 and 423, diode 422, capacitor 424 and Schmidt trigger NAND gate 425 form an oscillator with a nonsymmetrical duty cycle, driving the transistor 430 current source, thereby causing LED 431 to flash, indicating a waiting message. Resistors 421 and 423 and capacitor 424 determine the on time and duty cycle of the LED. Since the LED oscillator is the only oscillator in system 100, and its frequency is on the order of 1 hertz, current drawn by the indicator system is very low during on-hook operation. To balance the current and control the time between test cycles when no stuttered dial tone is present, 1K resistor 441 and diode 442 give similar cycle times whether a stuttered dial tone was present on the telephone line or not.

The method and apparatus for detecting stuttered dial tones can be adapted to the line-powering of any static load devices. In system 100, the emitter-follower pair formed by transistor 213 and resistor 214 are static loads that draw $V_{cc}$ current only when system 100 is taken off-hook. When system 100 is on-hook, these static loads draw no $V_{cc}$ current. Resistor 410 is also a static load that only draws current when system 100 is off-hook, in its charging and testing cycle. Resistor 410 is enabled to draw current by the Inverse Test signal 341.

Although one embodiment has been described, other embodiments are also contemplated. For example, the detection system can be fabricated as an integrated circuit.

By purposely depleting capacitor 244, system 100 can check for messages soon after the telephone rings, or is taken off-hook for any reason, rather than waiting for the normal capacitor discharge cycle, so that it more quickly detects messages after they have been left. The circuitry shown in FIGS. 1 through 4 initiates testing cycles on the order of every five minutes, regardless of when the telephone rings. If a message is left while the telephone is off-hook, the test cycle is initiated 15 to 30 seconds after the user goes off-line (on-hook), but only if capacitor 244 already has been drained. FIG. 5 illustrates a circuit that causes the same short 15 to 30 second delay before re-testing when the telephone is taken off-hook (that is, when a user picks it up), even when system 100 is not near its charge and test cycle time, and an approximately one minute delay if the telephone has merely rung. (The circuit of FIG. 5 additively connects to the circuits described in FIGS. 1 through 4, except that resistors 524 and 525 replace resistor 206 of FIG. 2.)

In FIG. 5, when telephone line 110 rings, Inverse Ring signal 350 stays low for 5 to 10 seconds after the telephone stops ringing, as previously discussed. The low output of Inverse Ring 350 turns transistor 512 on. Transistor 512 is supplied by Vstore 240. The voltage appearing at the collector of 512 is then divided by resistors 513 and 502 to bias transistor 501 on. Transistor 501 remains on until it has depleted capacitor 244 to a level that will no longer supply enough voltage to keep transistor 501 on, or until Inverse Ring signal 350 goes high again. The circuit of FIG. 5 provides an approximate one minute time delay after the telephone stops ringing before system 100 checks for a stuttered dial tone, regardless of the initial voltage level of capacitor 244.

When the telephone goes off-hook, DC In 210 drops to approximately 5 volts from the typical 48 volts when the line is not in use. When system 100 is on-hook, $V_{cc}$ appears at On-Hook signal 320. When the telephone line voltage drops due to the line being in use by another device, the voltage between resistors 524 and 525 drops far enough to allow the base of transistor 521 to be forward biased on and conduct current through resistor 522. Resistors 524 and 525 (replacing resistor 206 shown in FIG. 2) divide the input voltage with resistor 207. Once transistor 521 turns on, it forward biases the base of 501 and quickly depletes the voltage on line Vstore 240. The resistor divider ratio between resistors 523 and 502 is such that Vstore 240 will discharge to below the level at which a new charge and test cycle is initiated. When Vstore 240 gets to that point, system 100 goes off-hook, causing On-Hook signal 320 to go to a logic zero. This ends the discharge of Vstore 240. System 100 is then in the state where it is off-hook while the line is in use. Under these circumstances, it will wait 15 to 30 seconds after the line is no longer in use to initiate another charge and test cycle.

System 100 can also prevent incorrect message waiting indication from occurring when the telephone is taken off-hook in the middle of the system's test cycle, through the additional circuitry shown in FIG. 6. (The circuitry of FIG. 6 additively connects to circuitry of FIGS. 3 and 4, portions of which are shown, with two new breaks in prior circuit lines, denoted 630 and 640). When a user picks up telephone 10 during a test cycle, Vline 221 is forced to a low voltage as the line voltage drops. This turns transistor 601 off and resets memory 339 with voltage provided through pull-up resistor 604. This takes system 100 out of the test cycle. System 100 now goes back into the test cycle 15 to 30 seconds after the device is returned to on-hook, by the method described in the previous paragraph. Since counter 414 was reset at the beginning of the test cycle and the cycle was not allowed to finish, the Q3 output of latch 414 may indicate that no message is present even though there is one. To prevent this possibly incorrect indication from being displayed, memory 612 shifts information to its output to light message waiting light 431 only if a stuttered dial tone has just been detected when system 100 goes back on-hook. This is accomplished by using the on-hook signal 320 to clock the data into the output of memory 612.

System 100 can provide for a longer time period between test cycles by obtaining as much energy as possible from the line. Turning to FIG. 7, a voltage converter 700 supplies $V_{cc}$ power to system 100 while it is on-hook, for operating indication LED 431. The circuitry of FIG. 7 additively connects between DC In 210 and $V_{cc}$. At the input of voltage converter 700 is an RC filter comprising resistor 701 and capacitor 702 to isolate any switching noise from telephone line 110. Clock 708 pulses at a frequency determined by the amount of power required from the line. The clock pulse is coupled into the base of transistor 705 by means of capacitor 707 through resistor 706. Current pulled through the base turns the transistor on, and current in the other direction turns the transistor off and recycles charge through diode 704 back into capacitor 702. The DC isolation provided by capacitor 707 allows base current to be used at a low voltage (the level of $V_{cc}$) rather than at the telephone full DC input voltage of over 40 volts, and greatly improves system efficiency. This DC isolation can be used on any step down voltage converter of this type. Resistor 703 discharges the base of transistor 705 to hold it off in its quiescent state. When transistor 705 is on, it conducts current through inductor 710 to capacitor 237 (via $V_{cc}$). The charge on capacitor 237 ramps up while transistor 705 is on and ramps down while transistor 705 is off.

The operation of system 100 can be summarized by state diagram 800 of FIG. 8. When system 100 is connected to a pair of telephone line, and no other device is currently off-hook, system 100 remains in state 810. The charge on capacitor 244 is high, so system 100 is not charging that capacitor. The line interface block 200 is off, and the phone (or other telephonic device) is on-hook. Internal signals have values as follows: On-Hook is high, and Test, Vline and BaseDrive are low.

When the charge on capacitor 244 drops below its threshold, system 100 begins the test and charging cycle by entering state 820, providing a low-impedance current source mode that quickly charges depleted capacitor 244. On-Hook is low, Test is high, Vline is greater than 0.5 V and BaseDrive is greater than 1.2 V. If a user should pick up a telephone handset during this cycle, or another device (e.g., modem) should try to use the telephone line, the test and charging cycle aborts and system 100 enters state 830. State 830 provides a high-impedance low current interface to the telephone line, which does not charge capacitor 244 but rather maintains supply voltage $V_{cc}$. On-Hook is low, Test is high, Vline is approximately 0.1 V and BaseDrive is approximately 1.0 V. When the user finishes use of the telephone line, system 100 goes back to state 820 without a delay.

If system 100 is in state 810 and a user picks up a handset of device 10, for example, telephone line 110 goes off-hook and system 100 enters state 840, which is not much different from state 810. However, if capacitor 244 should drain below its threshold while telephone line 110 is in-use, system 100 moves from state 840 to state 830, and begins maintaining supply voltage $V_{cc}$. If system 100 has entered state 830 in this manner, the signals are slightly different: On-Hook is still low and Vline is low, but Test is low and BaseDrive is approximately 0.8 V. Once device 10 no longer uses telephone line 110, system 100 moves from state 830 to state 820, but only after a 15 second or so delay, so that the central messaging system (e.g., the PBX) can update message waiting status signals.

What is claimed is:

1. A method for deriving operating power from a pair of telephone conductors, comprising:

detecting the level of energy stored in an energy storage device;

providing a charging control signal when the detected energy level stored in the energy storage device has fallen below a threshold;

charging the energy storage device using current drawn from the telephone conductors when the charging control signal is provided;

detecting the presence of a call progress tone on the telephone conductors; and stopping the detection of the call progress tone and the charging of the energy storage device if another device couples the pair of telephone conductors in parallel to an off-hook impedance.

2. The method as claimed in claim 1 further comprising:

coupling the pair of telephone conductors to an off-hook impedance after a delay of time after the other device no longer couples the pair of telephone conductors to an off-hook impedance;

charging the energy storage device using current drawn from the pair of telephone conductors while the telephone lines remain coupled to the off-hook impedance;

detecting the presence of the call progress tone on the telephone conductors while coupled to the off-hook impedance; and indicating the presence of the call progress tone on the pair of telephone conductors.

3. A method for deriving operating power from a pair of telephone conductors, comprising:

detecting the level of energy stored in an energy storage device;

providing charging control signal when the detected energy level stored in the energy storage device has fallen below a threshold;

charging the energy storage device using current drawn from the telephone conductors when the charging control signal is provided;

detecting the presence of a call progress tone on the telephone conductors; and draining the energy in the energy storage device to a level that is below the first threshold if another device has coupled the pair of telephone conductors in parallel to an off-hook impedance.

4. The method as claimed in claim 3 wherein the call progress tone is a stuttered dial tone.

5. A line-powered apparatus for deriving operating power from a pair of telephone conductors, comprising:

an energy storage device;

a detector coupled to the energy storage device to detect the energy level stored in the energy storage device when the apparatus is on-hook or off-hook;

an energizer coupled to the energy storage device to energize the energy storage device from a pair of telephone conductors when the energizer receives from the detector a signal indicating that the detected energy level has fallen below a threshold;

a call progress tone detector adapted to be coupled to the telephone conductors to detect a call progress tone on the telephone conductors;

an indicator coupled to the call progress tone detector; and a line impedance detector adapted to be coupled to the telephone conductors and operable to detect when an off-hook impedance of another apparatus is coupled in parallel to the telephone conductors.

6. The apparatus as claimed in claim 5 wherein the call progress tone detector further comprises:

a transistor amplifier coupled to the pair of telephone conductors;

a bandpass filter coupled to the output of the transistor amplifier;

an analog-to-digital converter coupled to the output of the bandpass filter; and a digital counter coupled to the output of the analog-to-digital converter.

7. The apparatus as claimed in claim 6 wherein the call progress tone detector detects a stuttered dial tone.

8. The apparatus of claim 5 wherein the line impedance detector is coupled to the energizer and is operable to signal to the energizer to stop energizing the energy storage device when an off-hook impedance of another apparatus is detected to be coupled to the telephone conductors.

9. The apparatus of claim 5 further comprising energy draining means coupled to the energy storage device for draining the energy storage device to below a threshold when an off-hook impedance of another apparatus is detected to be coupled to the telephone conductors.

10. A line-powered apparatus deriving operating power from a pair of telephone conductors, the apparatus comprising:

a detector adapted to be coupled to the telephone conductors and operable to detect when an off-hook impedance of another apparatus is coupled in parallel to the telephone conductors; and an energizer coupled to the detector and to the telephone conductors to provide from the telephone conductors a first operating energy level for use by the apparatus when an off-hook impedance of another apparatus is detected by the detector and to provide from the telephone conductors a second operating energy level, different from the first energy level, for use by the apparatus when an off-hook impedance of another apparatus is not detected by the detector.

11. The apparatus of claim 10 wherein the energizer is a current source.

12. The apparatus of claim 11 wherein the energizer includes a current limiter for limiting the amount of current that can be provided when an off-hook impedance of another apparatus is not detected by the detector.

13. A line-powered apparatus deriving operating power from a pair of telephone conductors, comprising:

an energy storage device for providing operating power to the line-powered apparatus;

a detector coupled to the energy storage device to detect the level of energy stored in the energy storage device when the apparatus is on-hook or off-hook;

an energizer coupled to the energy storage device and to the telephone conductors to energize the energy storage device from the telephone conductors when the energizer receives from the detector a signal indicating that the detected energy level has fallen below a first threshold, the energizer being operable to stop energizing the energy storage device when the energizer receives from the detector a signal indicating that the detected energy level has risen above a second threshold that is different from the first threshold; and a line impedance detector coupled to the energy storage device, the line impedance detector being adapted to couple to the telephone conductors and being operable to detect when an off-hook impedance of another apparatus is coupled in parallel to the telephone conductors.

14. The apparatus as claimed in claim 13 wherein the energy storage device is a capacitor.

15. The apparatus of claim 13 further comprising an off-hook impedance, the off-hook impedance selectively coupled to the telephone conductors by the detector.

16. A method for deriving operating power for a line-powered apparatus from a pair of telephone conductors, comprising:

detecting the level of energy stored in an energy storage device when the apparatus is on-hook or off-hook, the energy storage device providing operating power to the apparatus;

charging the energy storage device using current drawn from the telephone conductors when the detected energy level has fallen below a first threshold;

stopping the charging of the energy storage when the detected energy level has risen above a second threshold that is different from the first first threshold; and draining the energy in the energy storage device to a level that is below the first threshold if another device has coupled the pair of telephone conductors in parallel to an off-hook impedance.

17. The method as claimed in claim 16 further comprising:

coupling the pair of telephone conductors to an on-hook impedance when the detected level of energy of the energy storage device is above the second threshold.

18. The method as claimed in claim 16 wherein the energy storage device is a capacitor.

19. The method of claim 16 further comprising the step of coupling the telephone conductors to an off-hook impedance when the detected energy level of the energy storage device has fallen below the first threshold.

20. The method of claim 16 further comprising detecting the presence of a call progress tone on the telephone conductors.

* * * * *